Sept. 15, 1959            R. FAVRE            2,903,821

MAGNETICALLY GUIDED MINIATURE VEHICLE SYSTEM

Filed July 20, 1955            2 Sheets—Sheet 1

INVENTOR
ROBERT FAVRE
BY
ATTORNEY

Sept. 15, 1959            R. FAVRE            2,903,821

MAGNETICALLY GUIDED MINIATURE VEHICLE SYSTEM

Filed July 20, 1955            2 Sheets-Sheet 2

INVENTOR
ROBERT FAVRE
BY
ATTORNEY

United States Patent Office 2,903,821
Patented Sept. 15, 1959

2,903,821
MAGNETICALLY GUIDED MINIATURE VEHICLE SYSTEM

Robert Favre, Lausanne, Switzerland

Application July 20, 1955, Serial No. 523,249

3 Claims. (Cl. 46—236)

This invention relates to apparatus for magnetically steering miniature vehicles, distinguished by the fact that the road or path to be followed by the vehicle is provided with at least one ferromagnetic track, coupled magnetically to a pilot magnet carried by the vehicle, the force resulting from this coupling being transmitted to a device for steering the vehicle.

Accordingly, the present invention has in view the provision of a miniature vehicle intended to travel over a roadway including a magnetic track and the vehicle chassis, provided with suitable propelling rear wheels, is also provided with a dirigible front wheel unit including a pilot magnet mounted between the said front wheels and adapted to oscillate when the vehicle deviates from a prescribed path to brake one or the other of the front wheels to return the vehicle into the desired path.

One form of the invention is illustrated in the accompanying drawings wherein.

Similar reference numerals designate corresponding parts throughout the several figures of the drawings.

In the embodiment shown, the device comprises a roadway or base 1 including a strip of ferromagnetic material P. The roadway together with the strip P constitutes a track over which moves a pilot magnet assembly designated generally as A, and carried by the front portion of the chassis $a$, $b$, $c$ of a miniature vehicle.

The said magnet assembly includes a horizontally disposed magnetized bar C whose opposite ends are held to the vertical pole pieces M' and M² by the web C' and the legs C² of an inverted U-shaped non-magnetic bracket E, the said legs being connected to the shank portions C³ of the braking elements which include the lugs D' and D².

The pole pieces M' and M²; the legs C² of the inverted U-shaped member C¹ as well as the shank portions C³ of the braking members are provided with registering openings L' and L² which receive the axle B of non-magnetic material and having the spindle portions F' and F² carrying the wheels W and W'.

Figure 3:
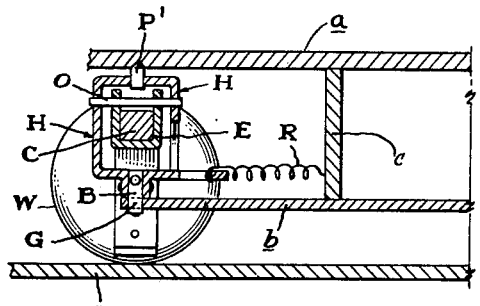
Figure 3 is a detail sectional view taken on the line 3—3 of Figure 1.
Figure 2:
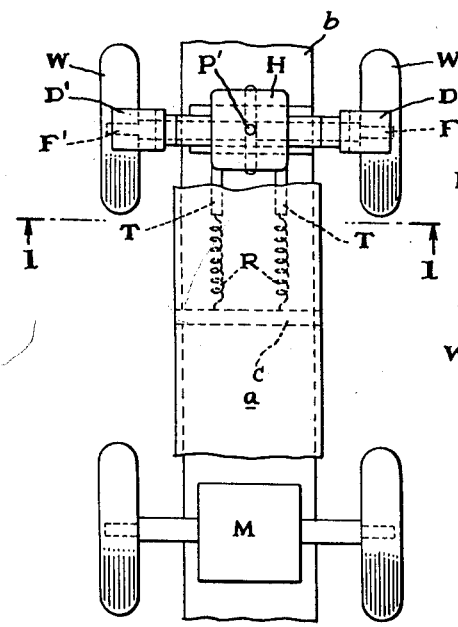
Figure 2 is a top plan view of the vehicle illustrating the power-driven wheels and the dirigible front wheel unit.
Figure 5:
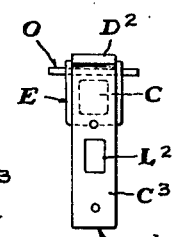
Figure 5 is a detail side elevation of the magnet.

As will be seen from Figs. 3 and 5, in particular, the magnetized bar C medially carries the U-shaped non-magnetic bracket E. The upper arm portions of the bracket E support a horizontal pivot pin O whose opposite ends are mounted in related front and rear side walls of the substantially rectangular axle carrying frame H. As will be further apparent from Fig. 3, the axle B is secured to the lower portion of the rectangular frame H and is provided with the lower pivot G mounted in chassis part $b$, said pivot G being aligned with the top pivot P' to provide a vertical axis about which the magnet assembly A and the front wheels mounted outwardly thereof can turn. The magnet assembly A is spring biased to normal position. For example, portions T of the rear wall of the rectangular frame H may be cut out and turned down to provide abutments for anchoring one end of springs R whose opposite ends are connected to the vertical chassis part C.

Figure 1:
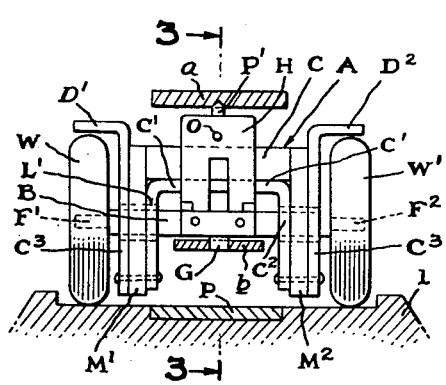
Figure 1 is a front elevation, partly in section, taken on the line 1—1 of Figure 2, illustrating the front wheels of the vehicle and the control magnet mounted therebetween and showing the relation of said magnet to a roadway having a magnetic track.
Figure 6:
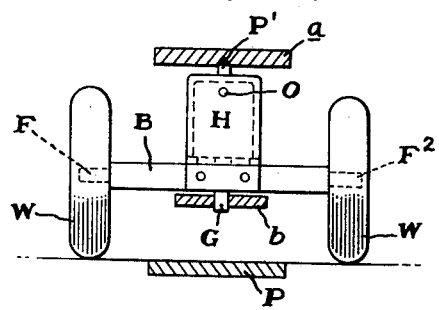
Figure 6 is a detail cross-sectional view, partly in elevation, illustrating more clearly the manner in which the front axle is mounted on a vertical axis.
Figure 8:
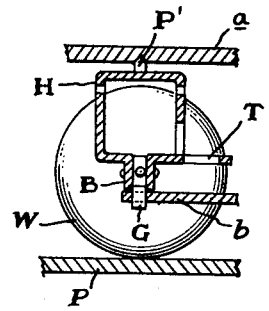
Figure 8 is a detail vertical section on the order of Figure 3 with the magnet omitted to better illustrate the frame in which it is mounted and the aligned vertical pivots for the frame which are mounted in the chassis.
Figure 7:
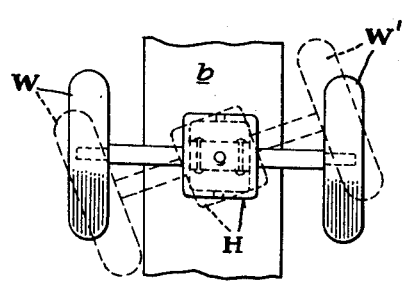
Figure 7 is a detail diagrammatic top plan view illustrating the construction of Figure 6 in the normal position by full lines and the changed position in dotted lines.

As will be clearly apparent from Figs. 1, 6 and 8, the vertically aligned pivots G and P' will permit the wheels to assume angular positions with respect to the roadway, while, as will be clearly seen from Figs. 1, 3 and 5, the magnet assembly A is mounted on the pivot O to oscillate laterally across the roadway.

Figure 4:
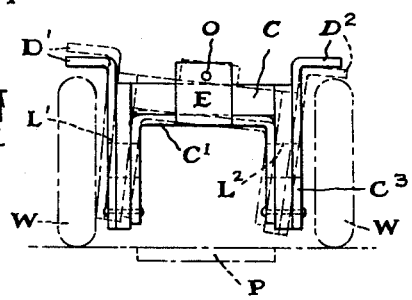
Figure 4 is a front elevation of the horseshoe type magnet with its normal position shown in full lines and its braking position shown in dotted lines.

The effect of the lateral swinging or oscillating movement of the magnet assembly A is, as shown in Fig. 4, to bring one or the other of the brake lugs D' or D² into contact with a related wheel and thus perform a braking function which will tend to return the vehicle to its normal path. In other words a deviation of the vehicle to the left side of the magnetic track causes the pilot magnet to incline to the left and its lug D² will engage the tread of the right wheel W'. This results in friction which is transmitted into a tangential force at the point of contact with the roadway. The movement of the magnet assembly about the pivots G and P' will bring the vehicle back to its predetermined path. When the magnet assembly A is in the position shown in Fig. 1 and in the full line position shown in Fig. 4, the magnet is in a state of equilibrium and this is only disturbed when the vehicle deviates from its assigned path.

Figure 9:
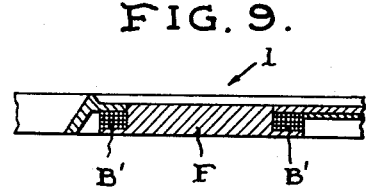
Figure 9 is a detail cross-sectional view of the track taken on the line 9—9 of Figure 10.
Figure 10:
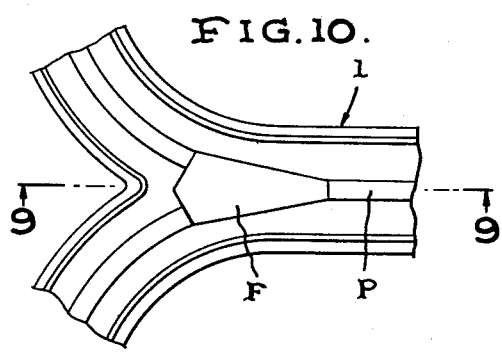
Figure 10 illustrates a Y-portion of the roadway and the related magnetic path.

The magnetic track can have remotely controlled fork functions of simple construction. As shown in Figures 9 and 10, for example, the fork which constitutes a continuation of the roadway and track P includes an electro-magnet F which may be excited by a coil B'.

Depending upon the polarity of the magnet A, the magentic steering circuit will be inclined in one direction or the other, thus giving the required direction to the vehicle. In order to make the vehicle follow one or the other of the roads at the junction, it is sufficient to produce a couple of forces of the pilot magnet in the required direction.

I claim:

1. A miniature vehicle system, including a vehicle chassis, power driven rear wheels and dirigible front wheels on the chassis, a roadway for the vehicle, a magnetic track on the roadway for guiding said vehicle thereover, and a steering unit on said vehicle for controlling the front wheels, said unit including brake means for each wheel, a horseshoe type pilot magnet located in operative juxtaposition to said track for controlling said brake means and spring biased to normal position relative to said track, means mounting said magnet between said front wheels to turn on a vertical axis to move in a plane parallel to the roadway, and means mounting said magnet on a horizontal axis to oscillate transversely of the roadway upon deviation of the vehicle from the track and cause said brake means alternatively to engage one or the other of said front wheels to aid in directing the path of the vehicle over the roadway.

2. A miniature vehicle system, including a roadway, a track of magnetic iron extending longitudinally of the roadway, a vehicle chassis, a motor for driving the rear wheels, and means for steering said front wheels, said means including a horseshoe type pilot magnet mounted between the front wheels to swing on a horizontal axis and to oscillate in a vertical plane transverse to the roadway, said magnet having its pole terminals disposed in the zone of and above the track, a pair of lugs carried by the pilot magnet and which, when the magnet is in equilibrium are clear of the front wheel treads and when the magnet tilts in one direction, one of the lugs will be lowered to engage the related wheel tread to retard one wheel in relation to the other to cause the front wheels to steer the vehicle.

3. A miniature vehicle system, including, a roadway, a track of magnetic iron extending longitudinally of the roadway, a vehicle chassis, front and rear wheels supporting the chassis, a motor for driving the rear wheels, and means for steering said front wheels, said means including a horseshoe type pilot magnet mounted between said front wheels to swing on a horizontal axis for oscillation in a vertical plane transverse to the roadway, said magnet comprising a horizontal magnetized bar held between two vertical pole pieces having vertical slots, brake lugs disposed outwardly from the upper ends of the pole pieces, an axle for the front wheels projecting through said slots, a U-shaped bracket of non-magnetic material carried by said bar and having arms projecting above the same, a substantially rectangular frame carried by the axle and surrounding said bracket, vertical axis pivot means on said frame and chassis for permitting the front wheels to turn right or left, a horizontal pivot pin disposed longitudinally of the vehicle and through the frame and bracket to oscillatably support the bar to permit the magnet to swing transversely of the roadway, whereby, the brake lugs may alternatively engage the tread of a related front wheel to steer the vehicle, and a spring anchored at one end to the chassis and connect at its other end to the frame for returning the axle to normal position.

References Cited in the file of this patent

UNITED STATES PATENTS

| 2,239,395 | Mallory | Apr. 22, 1941 |
| 2,339,291 | Paulus | Jan. 18, 1944 |
| 2,668,389 | Morrison | Feb. 9, 1954 |
| 2,690,626 | Gay et al. | Oct. 5, 1954 |
| 2,691,946 | Marmo | Oct. 19, 1954 |

FOREIGN PATENTS

| 669,167 | Great Britain | Mar. 26, 1952 |